United States Patent [19]

Walzer

[11] 4,199,469
[45] Apr. 22, 1980

[54] COMPOSITION AND METHOD FOR CLEANING DRINKING WATER TANKS

[75] Inventor: Michael Walzer, Landsberg, Fed. Rep. of Germany

[73] Assignee: Feldmann Chemie, Fed. Rep. of Germany

[21] Appl. No.: 917,653

[22] Filed: Jun. 21, 1978

[51] Int. Cl.² ............................................. C11D 7/08
[52] U.S. Cl. .................................... 252/146; 252/80; 252/82; 252/87; 252/148; 252/175; 252/180; 252/181; 134/3; 134/24; 134/34; 134/41
[58] Field of Search ............... 252/146, 148, 547, 82, 252/80, 87, 180, 181, 175; 134/3, 24, 34, 41

[56] References Cited

U.S. PATENT DOCUMENTS

| 3,424,688 | 1/1969 | Boiko et al. | 252/87 |
| 3,458,354 | 6/1969 | Reich | 134/3 |

*Primary Examiner*—Mayer Weinblatt
*Attorney, Agent, or Firm*—Craig and Antonelli

[57] ABSTRACT

A composition and method for cleaning tanks for drinking water, particularly for removing deposits consisting mainly of an agglomerate of algae, microorganisms and ochre sediments. The composition is an aqueous solution comprising about 3 to 6% of ascobic acid, 2 to 3% of formic acid, 7 to 10% of phosphoric acid, 1 to 3% of citric acid, 13 to 15% of hydrochloric acid and 10 to 15% of an aqueous isopropyl alcohol (all % by weight). The method involves spraying said aqueous solution under pressure onto the deposits.

11 Claims, No Drawings

COMPOSITION AND METHOD FOR CLEANING DRINKING WATER TANKS

The present invention relates to a composition and method of cleaning tanks for drinking-water, in particular of removing a particular type of deposits formed at the walls of large-size drinking-water tanks and which are mainly an agglomerate of algae, microorganisms and ochre sediments including also iron, manganese and calcium. These deposits are typical for surfaces which are alternately contacted by air and water because of the ever changing level of water in said tanks.

Normally the walls of drinking-water tanks of the type in question consist of concrete or concrete covered with ceramic wall tiles or with a plastic sheet material. The above mentioned deposits adhere very firmly to the walls of these tanks because the mixture of living components, like algae and microorganisms, and ocher sediments forms a nearly integral part of the walls of the tanks. The ceramic surface material of these walls offers pores micro voids and gaps which favour the settlement of the above deposits.

The problem of cleaning drinking-water tanks of the type in question—including smaller storage containers, and in particular large-size storage tanks, used for instance by municipalities and the like organizations—has existed for a relatively long period of time. For the purpose of cleaning, aqueous solutions were employed, containing aliphatic carboxylic acids and particularly citric acid. This use entails the drawback that such solutions have to be heated until higher temperatures are reached, in order that they become effective. Besides there are relatively long reaction periods and, as a rule, such a solution must be applied several times. This results in a time-consuming procedure with a lot of treating material being required.

The application of these solutions is effected for instance by means of scrubber-like devices, operated manually, by persons who have to use auxiliary devices such as ladders and the like. Workers who are prepared to do so hard work are rather rare. Also as seen from this aspect the cleaning is troublesome and time-consuming, much material being involved. Furthermore it will be appreciated that the cleaning time of drinking-water tanks is to be kept as short as possible, since long downtimes require the provision of a higher storage capacity.

There is a number of prior art compositions for removing oxide and carbonate scales on metal surfaces and in boiler tubes (U.S. Pat. Nos. 3,686,123, 3,803,042, 3,294,584, 3,607,781, 3,349,042 and Japanese Pat. No. 4 725 078). These compositions, however, differ strongly from the cleaning composition of the present application, because the known compositions are either acid pickling compositions for the removal of iron oxide from ferrous metals having been processed at elevated temperatures, or they are steam boiler cleaner and metal corrosion inhibitor compositions which often contain metal complexors.

On the other hand—as indicated above—the deposits and scales which are to be removed according to the present invention and the character of the basic material which is to be cleansed need a quite different cleaning composition as compared with that of the prior art.

For this purpose according to the invention an aqueous solution is provided which comprises about 3 to 6 percent by weight of ascorbic acid
2 to 3 percent by weight of formic acid (85% strength)
7 to 10 percent by weight of phosphoric acid (80% strength)
1 to 3 percent by weight of citric acid
13 to 15 percent by weight of hydrochloric acid (37% strength)
10 to 15 percent by weight of isopropyl alcohol (20% strength).

This solution according to the invention is sprayed under pressure onto the above described deposits. For this purpose quite a number of devices are suitable, depending upon the means existing; also rather simple pumps are suitable, for instance such pumps that can be operated by connecting them with the water supply. Such pumps are provided with a space being subdivided into two chambers by means of a diaphragm, one chamber being filled with the solution to be sprayed, the other chamber being connected with the water supply being under pressure. The pressure of the water supply causes the diaphragm to move into the chamber being filled with the solution to be sprayed, thus enlarging the chamber connected with the drinking-water supply. In this way the solution is caused to leave the chamber, thus being sprayed through an appropriate spraying lance (e.g., a rod provided with a spraying nozzle at its top) onto the areas to be cleaned. This is just an example of an especially simple spraying means having a simple mechanical set-up.

A very simple and quick operation is achieved according to the invention by spraying the aqueous solution containing L-ascorbic acid and by dispensing with any heating of said solution. By spraying the solution, each and every place where there are deposits of algae, microorganisms and ocher sediments can be reached quickly and in a convenient manner. This work can be done without encountering any difficulties and troubles. The aqueous solution containing L-ascorbic acid according to the present invention moreover provides a surprising success, that is, that the deposits and sediments are dissolved already after a few seconds.

As a rule it is not necessary to repeat the treatment of the objects to be cleaned.

By the treatment according to the invention, i.e., by the use of an aqueous solution of the above mentioned composition which is provided with a certain amount of L-ascorbic acid, and by spraying this solution onto the respective deposits and ocher sediments, an extremely convenient, quick and thorough cleaning of the tanks in question and of pertinent equipment is achieved.

In a preferred embodiment of the invention a certain percentage of disinfectant is added to the aqueous solution, in order that simultaneously with the cleaning the necessary disinfection is achieved. In this connection a relatively low percentage of 0.5 to 1 percent by weight (wt.%) of disinfectant is sufficient. Examples of suitable disinfectants are Amphoteriside (N-Dodecyl-diethylene-triamine-acetic acid and Formaldehyde.

As a further refinement of the composition according to the invention an aqueous solution is used, additionally containing 0.1 to 1 percent by weight corrosion inhibitors selected from alkyldimethyl-benzylammoniumchloride (Dodigen 5462), salts of quaternary ammonium bases having two methyl groups and two $C_{12}$ to $C_{18}$-hydrocarbon groups at the N-atom (Dodigen 95), imidazolines having a $C_{12}$–$C_{18}$-hydrocarbon radical such as 1-hydroxiethyl-2-heptadecenylimidazoline (Steinamin JM-OA of REWO Chemische Werke GmbH), 5 to 11-mole ethylene oxide adducts of dehydroabiethylamine (Polyrad of Hercules Inc.) and sodium lauroyl sarcosinate for the protection of the objects to be cleaned. In this way particularly the piping valves used in connection with such systems can be prevented from corroding.

According to a further very interesting modification of the invention, in order to prevent, especially avoid an extreme formation of foam, an aqueous solution can be employed additionally containing 0.01 to 0.1 percent by weight modified polyalkyleneglycols and/or organosiloxanes (silicones) such as dimethylpolysiloxanes (organosiloxanes). The advantages achieved thereby are the following: when washing off the solution from the walls of the tanks or the like, after a certain reaction time one can see in a better way whether the desired cleaning treatment penetrated into each and every part of the area to be cleaned, furthermore inconvenient addition of foam to the waste water is avoided.

Furthermore, an aqueous solution additionally containing about three (3) percent by weight alcohol (IPA) and about three (3) percent by weight acid-resisting tensides may be used for a better wetting of the areas to be cleaned, respectively, of the deposits and other sediments. In this way it can be achieved that the necessary reaction time is shortened even more and an even more reliable treatment, especially cleaning of all the deposits and ochre sediments can be achieved.

Due to different qualities of water, the deposits and sediments are not of an identical nature in all tanks respective of fields of application. Therefore the aforementioned useful enrichments of the aqueous composition of the invention should be employed in an appropriate and reasonable manner in various combinations.

As from the points of view of economy there is an interest in treating all cleaning problems arising with the same agent, if possible, in an especially preferred embodiment of the method according to the invention an acid-containing solution is used, comprising a great deal of or all of the aforementioned additions.

The temperature of the deposit or sediment and/or the substrate on which the sediment rests ranges preferably between 5° C. and maximally 15° C. during the treatment with the composition of this invention. Within this temperature range, the treating solution operates at optimum efficiency. The dissolving times of the sediments depend on whether these are pure sediments of one substance or of a mixture of substances. Examples of such sediments are:

(a) Lime sediments
(b) Manganese sediments
(c) Iron sediments
(d) Ochre sediments containing algae, microorganisms and decomposition products thereof and organic contaminants-containing sediments, and
(e) Mixed materials from sediments (a) through (d)

To remose the sediments mentioned from (a) to (e), the treating solution is applied, according to one embodiment, with a sprayer via a spraying lance and nozzle onto the surfaces of the surface to be purified and cleaned. The optimum pressure range to apply the treating solution is 2-3 bars. The treating solution itself must not be heated. Sediments or deposits of a normal thickness, i.e., up to maximally 1 mm., can de detached, when applying the treating solution at a pressure of about 2.5 bars, within the following time periods for each of the above-referenced sediments:

(a) 45-60 seconds
(b) 30-45 seconds
(c) 15-30 seconds
(d) treatment period up to 15 minutes.
(e) the application period is dependent on the age and the percentages of the individual substances in the mixture, but is maximally 15 minutes In case of particularly obstinate deposits, manual work is still unnecessary, rather, a repeated spraying operation will do the job of removing the deposits with treating solution.

It will be appreciated insofar as the deposits are not as yet visibly detached during the spraying operation, the structure of the deposits is yet destroyed and in the process of dissolution to such an extent that the deposits can be rinsed off with a strong water jet.

The thicker the sediment, the longer the wetting time with the treating solution. The spraying time, as well as the dissolution period are thus directly dependent on the thickness of the sediment.

Another important feature of the invention is that the pressure necessary for spraying the treatment solution should not be lower than 1.8-2 bars and no higher than 3-3.5 bars. The spraying pressure range of about 2-3 bars proved to be optimum for using the treating solutions set forth in the following Examples 1-9 during the evaluation of each. With a pressure that is too low, the wetting and mechanical effects are inadequate and, with too high a pressure, the misting effect is too strong and thus the operation becomes uneconomical.

EXAMPLES 1-9

A number of specific compositions for the treating solution of this invention are set forth in the following tables:

TABLE I

| Example No. | 1 | 2 | 3 | 4 |
|---|---|---|---|---|
| Formic Acid | 2.0 | 2.5 | 2.5 | 3.0 |
| Amines[1] | 0.5 | 0.3 | 0.5 | 3.5 |
| Ascorbic Acid | 3.0 | 4.0 | 5.0 | 3.5 |
| Fatty Alcohol Polyglycolether[2] | 1.5 | 2.0 | 3.0 | 1.0 |
| Formaldehyde 40% soln. | 0.3 | 0.5 | 0.5 | 0.4 |
| Imidazoline[3] | 0.5 | 0.7 | — | 0.4 |
| Isopropyl Alcohol 20% aqueous solution | 10.0 | 12.0 | 14.0 | 11.5 |
| Sodium Lauroyl Sarcosinate | — | — | 0.5 | 0.3 |
| Nonylphenol Polyglycol Ethers[4] | 1.5 | 1.0 | — | 2.0 |
| Organosiloxanes[5] | — | 0.1 | 0.2 | 0.15 |
| Phosphoric Acid 80% strength | 9.5 | 8.5 | 9.0 | 8.0 |
| Hydrochloric acid 37% strength | 13.5 | 14.0 | 13.0 | 14.5 |
| Citric Acid Crystalline | 1.5 | 1.0 | 2.0 | 2.5 |
| Chemically pure water | to 100 | to 100 | to 100 | to 100 |

[1]Examples 1 to 4: ½ Dodigen 95 = Quaternary ammonium salt having 2 methyl and 2 $C_{12}$–$C_{18}$-hydrocarbon groups and the N-atom
[2]Examples 1 to 4/ Genapol C-050 = condensation product of about 5-10 moles ethylene oxide and coco-fatty alcohol (Farbwerke Hoechst AG)
[3]Imidazolines having a $C_{12}$–$C_{18}$-hydrocarbonradical, e.g. 1-Hydroxyethyl-2-heptadecenylimidazoline (Steinamin JM-OA of REWO)
[4]Examples 1, 2 and 4: Arkopal N-100 (Farbwerke Hoechst AG) = condensationproduct of about 8-12 moles ethylene oxide and nonylphenol.
[5]Examples 2 to 4: ½ Silicone Anti Foam Emulsion S.R.E. containing 33% by weight Dimethylpolysiloxan and ½ Silicone Anti FoamEmulsion S.E.-57 containing 27% by weight Dimethylpolysiloxan(Wacker).

TABLE II

| Example No. | 5 | 6 | 7 | 8 | 9 |
|---|---|---|---|---|---|
| Formic Acid | 2.0 | 3.0 | 3.0 | 2.0 | 2.5 |
| Amines[1] | 0.4 | 0.2 | 0.5 | 0.2 | 0.1 |
| Ascorbic Acid | 4.0 | 4.5 | 3.0 | 3.5 | 5.5 |
| Fatty Alcohol Polyglycolether[2] | 2.5 | 3.5 | 3.0 | 1.5 | 3.0 |
| Formaldehyde 40% soln. | 0.4 | 0.5 | 0.3 | 0.5 | 1.0 |
| Imidazoline[3] | 0.3 | 0.2 | 0.2 | 0.4 | 0.4 |

TABLE II-continued

| Example No. | 5 | 6 | 7 | 8 | 9 |
|---|---|---|---|---|---|
| Isopropyl Alcohol 20% aqueous solution | 13.0 | 14.5 | 12.5 | 10.5 | 15.0 |
| Sodium Lauroyl Sarcosinate | 0.3 | 0.6 | 0.3 | 0.4 | 0.5 |
| Nonylphenol Polyglycol Ethers[3] | 0.5 | — | — | 1.5 | — |
| Organosiloxanes[4] | — | 0.3 | 0.2 | 0.05 | 0.5 |
| Phosphoric Acid 80% strength | 7.0 | 9.5 | 9.5 | 8.5 | 10.0 |
| Hydrochloric acid 37% strength | 14.0 | 13.5 | 13.0 | 14.5 | 15.0 |
| Citric Acid Crystalline | 1.0 | 2.5 | 1.5 | 2.0 | 3.0 |
| Chemically pure water | to 100 | to 100 | to 100 | to 100 | to 100 |

[1]Examples Nos. 6, 8 and 9: Polyrad = 5-11 moles ethylene oxide adduct of dehydroabiethylamine (Hercules Inc.), Examples 5 and 7 like Examples 1 to 4
[2]Examples 5 to 9: Genapol C-050 (Farbwerke Hoechst AG) likeExamples 1-4
[3]Like Examples 1-4
[4]Examples 5 and 8: Arkopal N-100 (Farbwerke Hoechst AG) likeExamples 2 to 4.

EXAMPLE 10

Each of the treating solutions exemplified in Examples 1-9 were evaluated to determine the effectiveness of each for removing a deposit having the thickness of from 0.1 to 1 mm. and consisting of iron (Fe), manganese (Mn), Calcium oxide (CaO) and magnesium oxide (MgO). This deposit was formed on a drinking-water tank having a capacity of 1.000 cm$^3$ and the area treated was 1.000×1.000 mm.

[The drinking water which formed the deposit had the following analysis: Fe=6.7 mg/l, Mn=0,2 mg/l, CaO=44.8 mg/l, MgO=15,6 mg/l, and was water taken from Wasserwerk Hemsbach water supply.] As set forth in Table 3 below, each treating solution effectively removed the deposit within a very short period of time from 45 seconds to 15 minutes. During these tests the temperature of the deposit was 15° C. and the treating solution was applied by a spray nozzle at a pressure of 2.0 to 2.5 bars.

TABLE III

| Treating Solution | Time Required To Dissolve Deposit | Spray Pressure | Type Of Deposit | Thickness Of Deposit |
|---|---|---|---|---|
| Example 1 | 10 minutes | 2.0 bars | See above | 0.5 mm |
| Example 2 | 10 minutes | 2.2 bars | " | 0.5 mm |
| Example 3 | 15 minutes | 2.0 bars | " | 0.8 mm |
| Example 4 | 7 minutes | 2.5 bars | " | 1.0 mm |
| Example 5 | 9 minutes | 2.1 bars | " | 0.4 mm |
| Example 6 | 12 minutes | 2.1 bars | " | 0.7 mm |
| Example 7 | 5 minutes | 2.3 bars | " | 0.6 mm |
| Example 8 | 8 minutes | 2.0 bars | " | 0.3 mm |
| Example 9 | 45 seconds | 2.4 bars | " | 0.1 mm |

From the examples above it will be apparent that the treating solution in accordance with the present invention is very effective for removing a number of different sediments found in drinking water tests and the make-up of the treating solution may vary considerably depending upon the specific type of sediment or deposit treated. In general it has been found that the amount of inorganic acids, i.e., hydrochloric acid and phosphoric acid, may vary considerably, with the amount of hydrochloric acid being from 13.0 to 15.0 percent by weight and the amount of phosphoric acid being from 7.0 to 10.0 percent by weight. As to the organic acids the L-ascorbic acid may be from about 3 to 6 wt. %, the formic acid may be from 2.0 to 3.0 percent by weight and the citric acid may be from 1.0 to 3.0 percent by weight.

The amount of alcohol, i.e., isopropyl alcohol, in a 20% solution may vary from 10.0 to 15.0 percent by weight and as indicated heretofore, the preferred amount is 3% by weight of pure isopropyl alcohol.

It will also be appreciated that although the presence of additional additives, such as corrosion inhibitors, foam inhibitors, and wetting agents provides an optimum composition for the treating solution, the presence of these additives is not absolutely essential and an effective treating solution may contain the following ingredients in percent by weight:

Example 11

TABLE IV

| INGREDIENTS | WEIGHT BY PERCENT |
|---|---|
| Ascorbic Acid | 3 to 5.5 |
| Formic Acid 85% strength | 2 to 3 |
| Phosphoric Acid 80% strength | 7 to 10 |
| Citric Acid | 1 to 3 |
| Hydrochlorid Acid 37% strength | 13 to 15 |
| Isopropyl Alcohol 20% strength | 10 to 15 |

Evaluation of treating solutions having the range of ingredients as set forth in Table IB above and the manner set forth in Example 10 reveal that these solutions can effectively remove deposits of iron, magnesium, calcium and ochre sediments within a period of 15 minutes. The composition of this invention is preferably used for cleaning non metal large-size drinking-water tanks.

What is claimed:

1. Composition for cleaning large-size storage tanks for drinking-water which comprises an aqueous solution containing about 3 to 6 percent by weight of ascorbic acid, about 13 to 15 percent by weight of hydrochloric acid, about 7 to 10 percent by weight of phosphoric acid, about 2 to 3 percent by weight of formic acid, about 1 to 3 percent by weight of citric acid, and about 10 to 15 percent by weight of 20 percent isopropyl alcohol solution.

2. Composition according to claim 1, wherein said formic acid is 85% strength, said phosphoric acid is 80% strength and said hydrochloric acid is 37% strength.

3. Composition according to claim 1, wherein said composition consists essentially of said aqueous solution.

4. Composition according to claim 3, wherein said aqueous solution consists essentially of ascorbic acid, hydrochloric acid, phosphoric acid, formic acid, citric acid and said isopropyl alcohol solution.

5. Composition according to claim 1, wherein said aqueous solution additionally contains 0.1 to 1 percent by weight of a corrosion inhibitor selected from the group consisting of $C_{12}$-$C_{18}$ alkyldimethyl-benzylammonium chloride, quaternary ammonium salts having two methyl groups and two $C_{12}$-$C_{18}$-hydrocarbon groups at the N-atom, 1-hydroxiethyl-2-heptadecenyl-imidazoline, ethylene oxide adducts of dehydroabiethylamine containing from 5-11 moles of ethylene oxide and sodium lauroylsarcosinate.

6. Composition according to claim 5, wherein said aqueous solution additionally contains 0.01 to 0.1 wt.% of a dimethylpolysiloxane antifoam and about 3 wt.% of an acid resisting tenside selected from the group consisting of a condensation product of about 5-10 moles ethylene oxide and coco-fatty alcohol and a condensation product of about 8-12 moles of ethylene oxide and nonylphenol.

7. Composition according to claim 1 or claim 6, wherein said aqueous solution additionally contains 0.5 to 1 wt.% of a disinfectant selected from the group consisting of N-dodecyl-diethylene-triamine acetic acid and formaldehyde.

8. A method of cleaning tanks for drinking-water by removing deposits of algae, microorganisms, iron, manganese, calcium and ochre sediments, which comprises spraying under pressure onto the deposits an aqueous solution containing 3 to 6 percent by weight of ascorbic acid, 2 to 3 percent by weight of formic acid, 7 to 10 percent by weight of phosphoric acid, 1 to 3 percent by weight of citric acid, 13 to 15 percent by weight of hydrochloric acid, and 10 to 15 percent by weight of 20 percent isopropyl alcohol solution.

9. A method according to claim 8, wherein said aqueous solution consists essentially of ascorbic acid, formic acid, phosphoric acid, citric acid, hydrochloric acid and said isopropyl alcohol solution.

10. A method according to claim 8, wherein said aqueous solution additionally contains 0.1 to 1 wt.% of a corrosion inhibitor selected from the group consisting of $C_{12}$–$C_{18}$ alkyldimethyl-benzylammonium chloride, quaternary ammonium salts having two methyl groups and two $C_{12}$–$C_{18}$-hydrocarbon groups at the N-atom, 1-hydroxiethyl-2-heptadecenyl-imidazoline, ethylene oxide adducts of dehydroabiethylamine containing from 5–11 moles of ethylene oxide and sodium lauroyl-sarcosinate and optionally 0.5 to 1 wt.% of a disinfectant selected from the group consisting of N-dodecyl-diethylene-triamine acetic acid and formaldehyde, 0.01 to 0.1 wt.% of a dimethylpolysiloxane antifoam and/or about 3 wt.% of an acid resisting tenside selected from a group consisting of a condensation product of about 5–10 moles ethylene oxide and coco-fatty alcohol and a condensation product of about 8–12 moles of ethylene oxide and nonylphenol.

11. A method according to claim 10, wherein said aqueous solution consists essentially of the ascorbic acid, the formic acid, the phosphoric acid, the citric acid, the hydrochloric acid, the isopropyl alcohol solution, the corrosion inhibitor, the disinfectant, the antifoam and the acid resisting tenside.

* * * * *